US006615942B2

(12) United States Patent
Shinohara et al.

(10) Patent No.: US 6,615,942 B2
(45) Date of Patent: Sep. 9, 2003

(54) SWIVEL TYPE WORKING VEHICLE

(75) Inventors: Eisaku Shinohara, Sakai (JP); Yasuo Nakata, Osaka (JP); Takeshi Kajimoto, Osaka (JP); Siro Sugiyama, Osaka (JP); Nobuo Higashino, Sakai (JP); Motoki Sunada, Kaizuka (JP); Yuji Tsutsui, Izumi (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 09/519,404

(22) Filed: Mar. 3, 2000

(65) Prior Publication Data
US 2003/0079925 A1 May 1, 2003

(30) Foreign Application Priority Data
Jun. 18, 1999 (JP) ............................. 11-172962

(51) Int. Cl.[7] .............................................. B62D 25/10
(52) U.S. Cl. ................. 180/69.21; 180/89.13; 37/379
(58) Field of Search .................... 180/69.21, 89.13, 180/89.17, 89.18; 37/379, 380; 296/37.1

(56) References Cited

U.S. PATENT DOCUMENTS

| 4,889,203 A | * | 12/1989 | Hagarty ................... 180/69.24 |
| 5,715,615 A | | 2/1998 | Murakami et al. ............. 37/379 |
| 5,806,620 A | * | 9/1998 | DeRees et al. ........... 180/69.21 |
| 5,890,556 A | * | 4/1999 | Shearn et al. ............ 180/69.21 |
| 6,030,029 A | * | 2/2000 | Tsuda et al. ................ 296/194 |

FOREIGN PATENT DOCUMENTS

| EP | 0743401 | 11/1995 | |
| JP | 07197488 | 8/1995 | |
| JP | 09003974 | 1/1997 | |
| JP | 09268597 | 10/1997 | |
| JP | H111939 | 1/1999 | ............. E02F/9/00 |
| JP | 11081380 | 3/1999 | |
| JP | 11081381 | 3/1999 | |
| JP | 11336123 | 12/1999 | |

* cited by examiner

Primary Examiner—Lesley D. Morris
Assistant Examiner—L. Lum
(74) Attorney, Agent, or Firm—Webb Ziesenhiem Logsdon Orkin & Hanson, P.C.

(57) ABSTRACT

A swivel type working vehicle having a turntable (3) with a rear hood (28) covering an engine (11) and a side hood (42) covering hydraulic equipment. The rear hood (28) includes a pivot device (30) disposed in an upper front end region thereof and having a pivot axis extending transversely of a vehicle body. The rear hood is pivotable by the pivot device between a closed position covering the engine and an open position exposing the engine. The side hood (42) includes a pivot mechanism (50) disposed in a lower front end region thereof and having a pivot axis extending transversely of the vehicle body. The side hood being pivotable by the pivot mechanism between a closed position covering the hydraulic equipment and an open position exposing the hydraulic equipment.

21 Claims, 7 Drawing Sheets

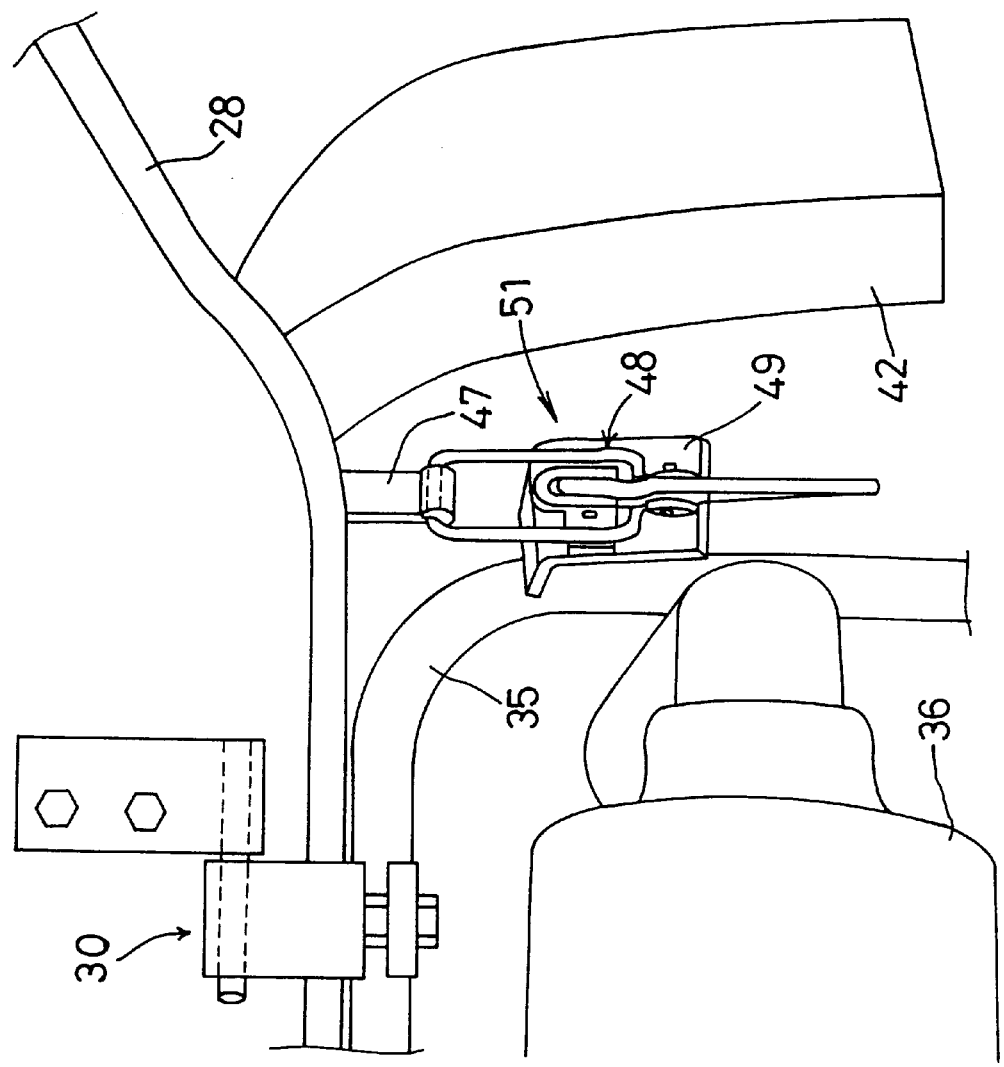

SWIVEL TYPE WORKING VEHICLE

BACKGROUND OF THE INVENTION

1. Field of the Invention

This invention relates to a swivel type working vehicle, such as a backhoe, having a traveling device, a turntable mounted on the traveling device to be revolvable about a vertical axis, an engine disposed in a rear region of the turntable, a hydraulically actuated implement disposed in a front region of the turntable, hydraulic equipment disposed on one side region of the turntable, a rear hood covering the engine, and a side hood covering the hydraulic equipment.

2. Description of the Related Art

In the swivel type working vehicle noted above, as disclosed in Japanese Patent Publication Kokai No. H11-1939, the engine is mounted in a horizontal position on the rear region of the turntable, with a blow-off type radiator disposed at the right side of the engine, and a driver's seat disposed forwardly of the engine. An oil tank, which is one of the hydraulic equipment, a fuel tank and a battery are disposed at the right side of the driver's seat. The engine and radiator are covered by the rear hood. The fuel tank, battery and oil tank are covered by the side hood.

In the conventional swivel type working vehicle, the side hood is openable or removable. However, no measure has been taken to prevent the side hood swung to an open position from obstructing access of the operator to the equipment covered by the side hood in a closed position. The side hood swung to the an open position may be obstructive to an operation to inspect and maintain the interior. Similarly, the rear hood swung to an open position could obstruct an inspect and maintain the engine and engine accessories.

SUMMARY OF THE INVENTION

Having regard to the disadvantage of the prior art noted above, an object of this invention is to provide a swivel type working vehicle with a rear hood and a side hood having optimal open positions. It is particularly important that the rear hood and side hood swung to open positions expose an engine and hydraulic equipment and present no obstacle to access for a maintenance service.

The above object is fulfilled, according to this invention, by a swivel type working vehicle wherein the rear hood includes a pivot device disposed in an upper front end region thereof and having a pivot axis extending transversely of a vehicle body, the rear hood being pivotable by the pivot device between a closed position covering the engine and an open position exposing the engine, and the side hood includes a pivot mechanism disposed in a lower front end region thereof and having a pivot axis extending transversely of the vehicle body, the side hood being pivotable by the pivot mechanism between a closed position covering the hydraulic equipment and an open position exposing the hydraulic equipment.

With this construction, when the two hoods are swung to the open positions, a rear portion of an engine room including the engine covered by the rear hood is fully opened, and a hydraulic implement room including an oil tank covered by the side hood is as a whole opened to the outside. Thus, areas from a rear portion to a side portion of the turntable are opened without being obstructed by the two hoods, to allow an inspecting and maintaining operation to be carried out with ease.

In a preferred embodiment of this invention the rear hood in the closed position and the side hood in the closed position have opposed edges substantially level with each other to form a smooth transition from an upper surface of the rear hood to an upper surface of the side hood. When the two hoods are swung to the open positions, one side of the turntable on which the hydraulic equipment is disposed is opened continuously from the rear of the turntable, to present an unobstructed view of the engine to the hydraulic equipment. When the two hoods are swung to the closed positions, the opposite surfaces form a smooth plane without irregularities, providing an excellent outward appearance.

In another preferred embodiment of this invention, the side hood defines a boundary on one side of the turntable, and the rear hood defines a rearward boundary of the turntable, a driver's seat being disposed in a space partially surrounded by the rear hood and the side hood. Thus, the two hoods provide a neat outward appearance rearwardly and laterally of the driver's seat. In addition, effective use is made of the spaces around the driver's seat.

In a further preferred embodiment of this invention, the side hood includes a locking device disposed in a rear region thereof for locking the side hood to the closed position, the locking device being accessible from outside when the rear hood is opened, and inaccessible from, outside when the rear hood is closed. With this construction, once the locking device is operated to lock the side hood and the rear hood is closed, the side hood cannot be opened without opening the rear hood. That is, opening of the rear hood is a precondition for opening of the side hood, and therefore only the rear hood may be locked film outside. The two hoods have a neat outward appearance.

The side hood may be adapted removable from the pivot mechanism. Then the side hood may be removed from the turntable as necessary.

In a further preferred embodiment of this invention, the side hood is formed of plastic, and has a reinforcing frame extending in a fore and aft direction along an inner surface thereof, the pivot mechanisms being connected to the reinforcing frame. This construction allows the side hood to be lightweight and easy to handle, without significantly lowering the rigidity of the side hood. In particular, the connection with the pivot mechanism which undergoes a heavy load should desirably be at the reinforcing frame.

For a reliable pivotal mounting of the rear hood, it is preferable that the pivot device is attached to an arched support frame fixed to the turntable so as to straddle the engine.

Other features and advantages of this invention will be apparent from the following description of the embodiment to be taken with reference to the drawings.

BRIEF DESCRIPTION OF THE DRAWINGS

FIG. 7 is a rear view showing a rear hood in an open position and a lock device.

DESCRIPTION OF THE PREFERRED EMBODIMENT

An embodiment of this invention will be described hereinafter with reference to the drawings.

Figure 1:
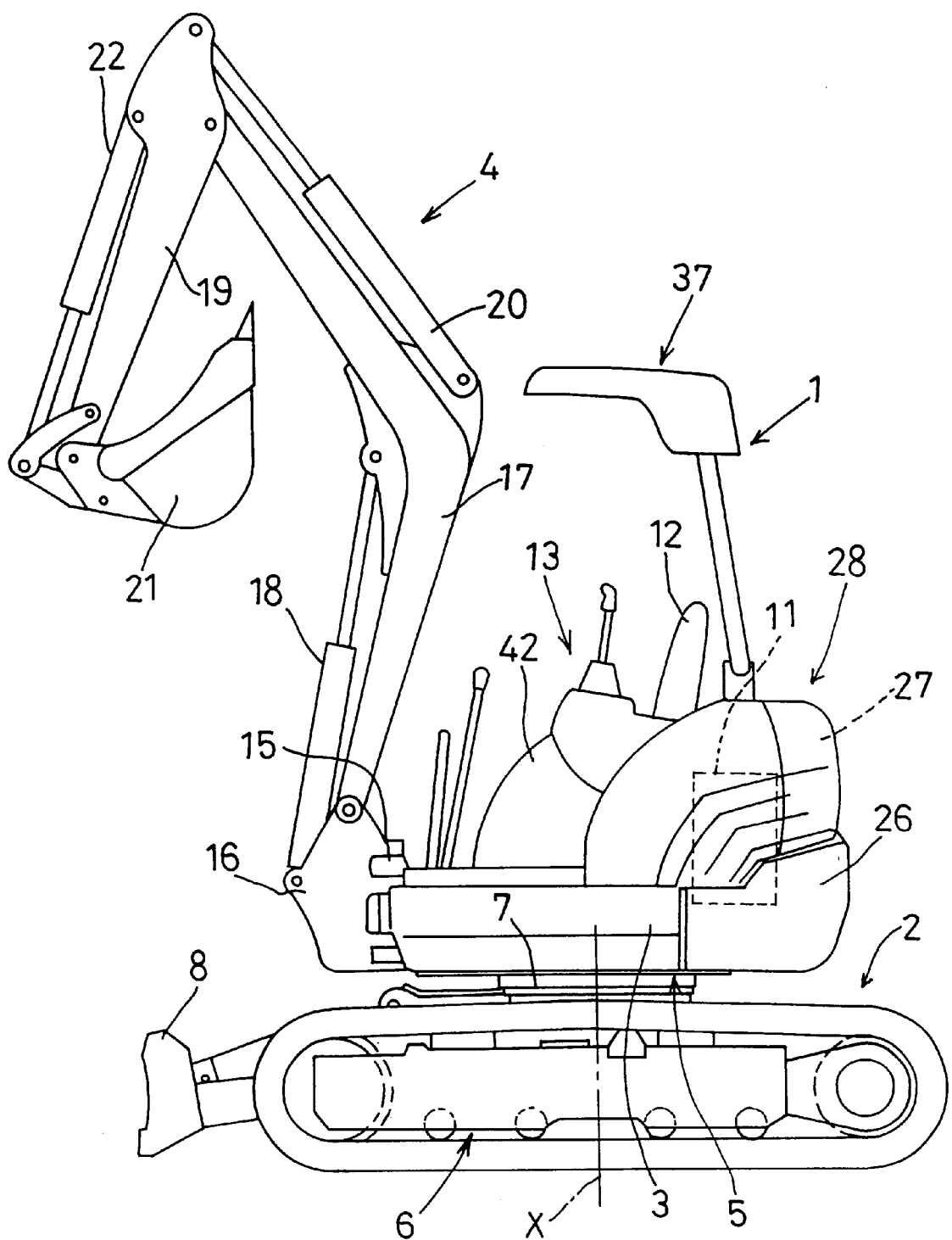
FIG. 1 is a side elevation of a backhoe which is one example of a swivel type working vehicle according to this invention.

FIG. 1 shows a backhoe 1 as one example of swivel type working vehicles. The backhoe 1 includes a crawler traveling device 2 acting as a lower base block, a turntable 3 and an excavator 4 constituting an upper structure 5 mounted on the lower base block. The crawler traveling device 2 supports the turntable 3 mounted on a track frame 6 through a swivel bearing 7 to be swivelable about a swivel axis X. The crawler traveling device 2 has a dozer blade 8 vertically movably attached to a front end thereof. This backhoe is the small turn type, with the rear of turntable 3 describing a smaller locus of turn than the excavator 4. Thus, the rear of turntable 3 never obstructs swiveling of turntable 3.

The turntable 3 has, mounted thereon, an engine 11, a driver's seat 12 and a control device 13. The excavator 4 is attached to the front of turntable 3 through a bracket 15 to be pivotable about a vertical axis. The excavator 4 includes a boom 17 and a boom cylinder 18 each having a proximal end thereof pivotally attached to a swing bracket 16 supported by the bracket 15 through the vertical axis. An arm 19 is connected to a distal end of boom 17 to be pivotable by the arm cylinder 20. A bucket 21 is connected to a distal end of arm 19 to be pivotable by a bucket cylinder 22 for earth pickup and dumping operations. A weight (counter weight) 26 is disposed at the rear of turntable 3. The engine 11 is mounted forwardly of the weight 26 and below and rearwardly of the driver's seat 12.

Figure 2:
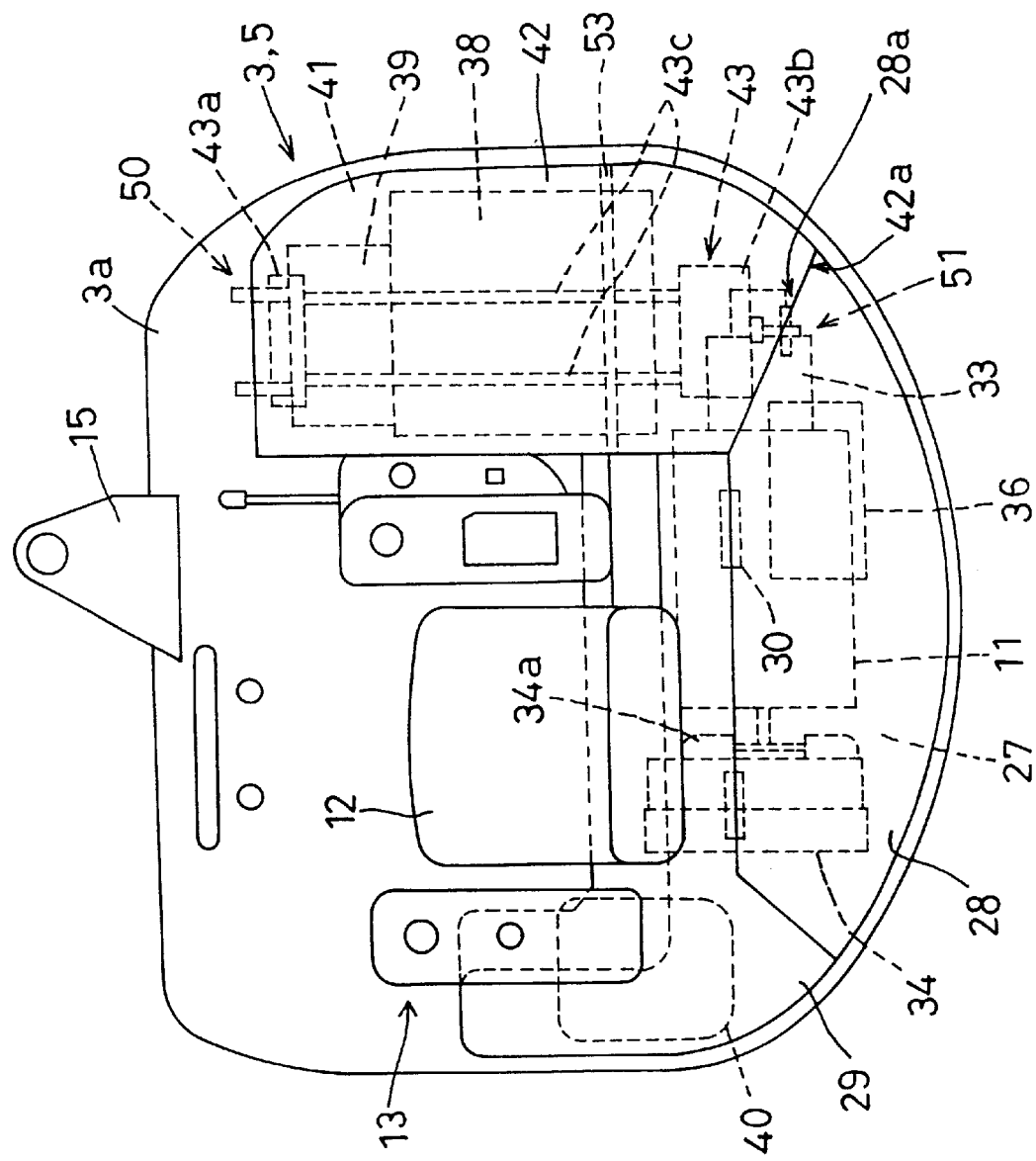
FIG. 2 is a plan view of a turntable of the backhoe shown in FIG. 1.
Figure 3:
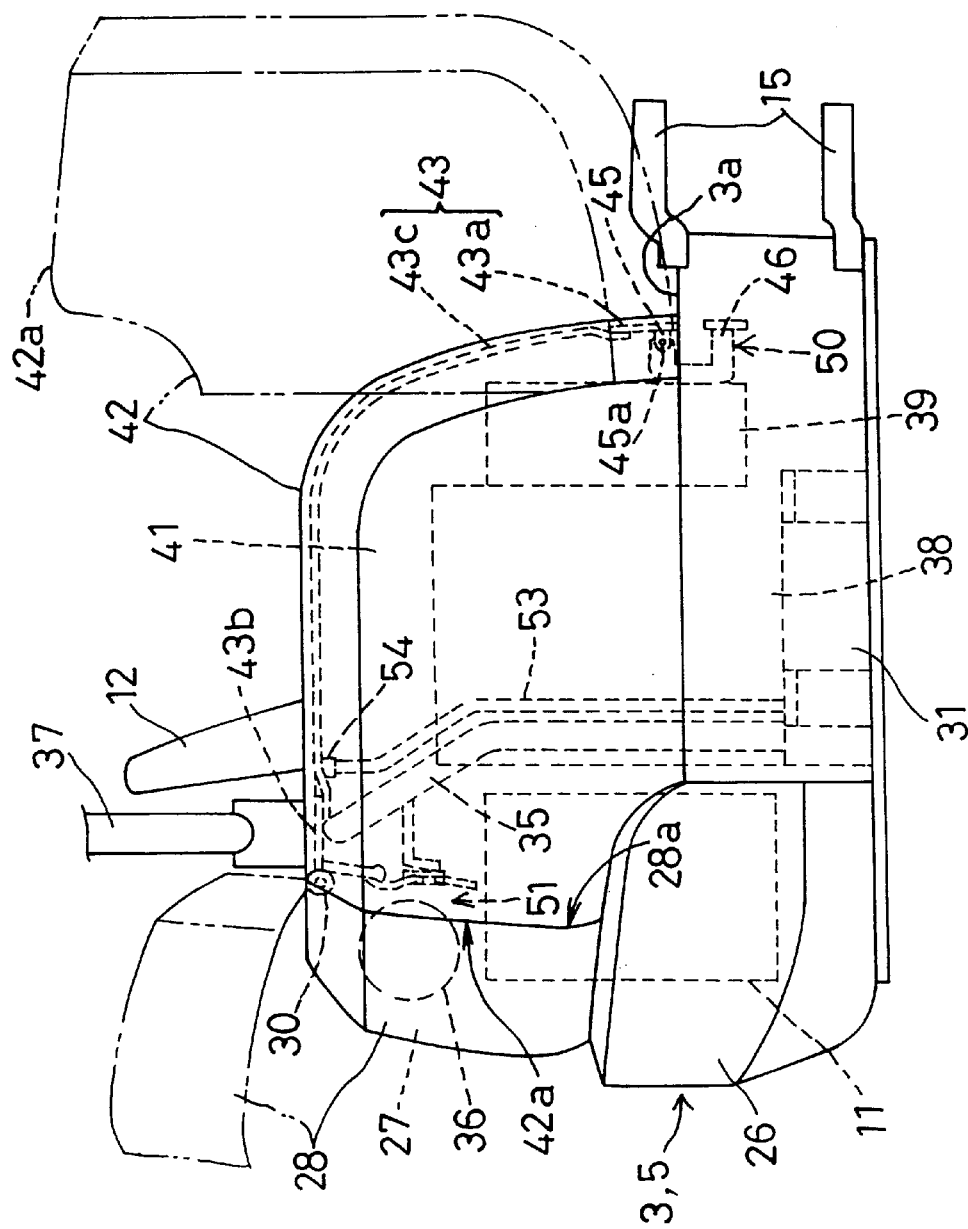
FIG. 3 is a side view of the turntable shown in FIG. 2.
Figure 4:
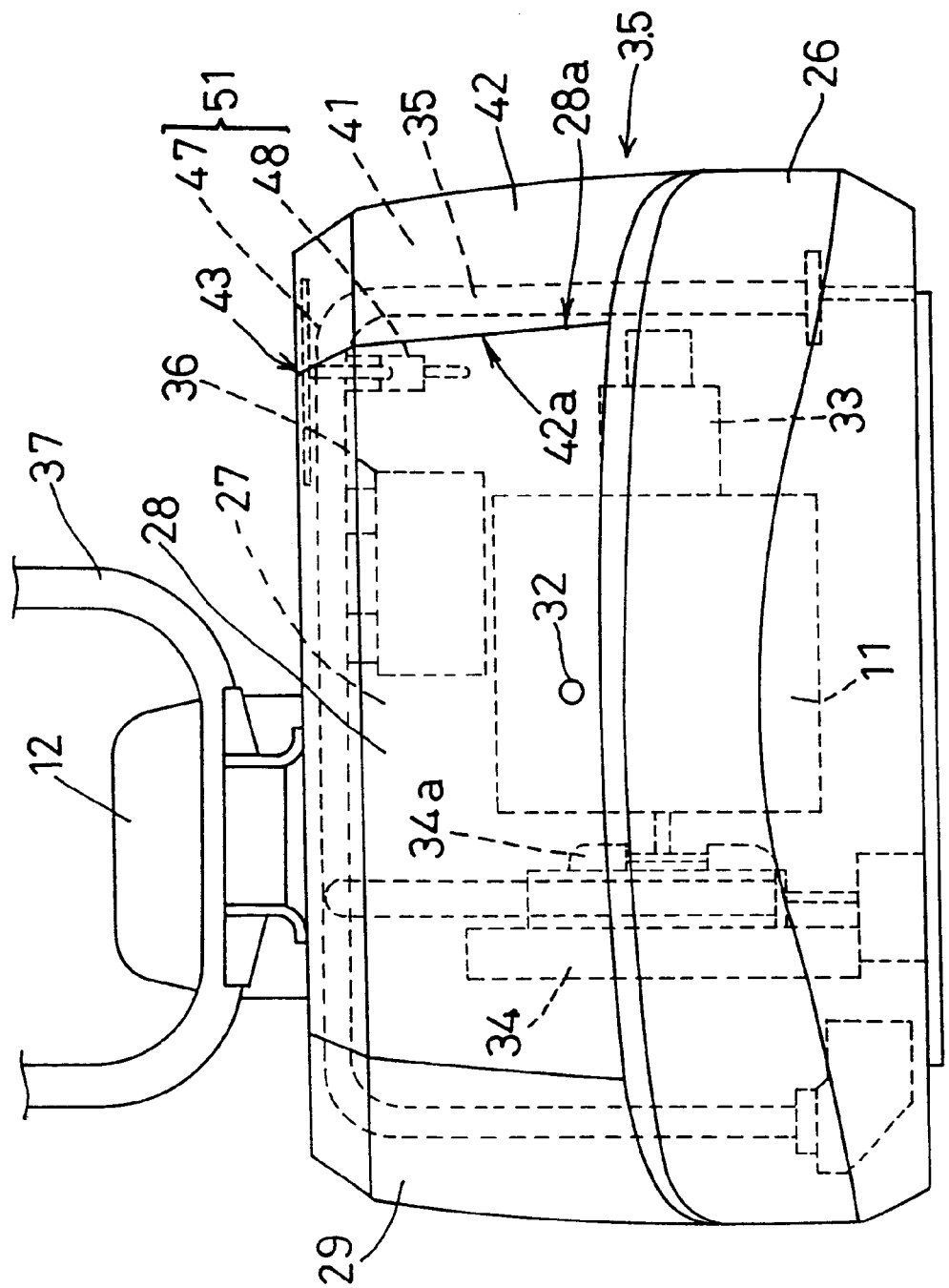
FIG. 4 is a rear view of the turntable shown in FIG. 2.

As seen from FIGS. 2 through 4, the engine 11 is disposed in an engine room 27 surrounded by a rear hood 28 and a fixed cover 29. Forwardly of these components, the driver's seat 12 is mounted on the turntable 3 through a mounting deck and a suspension. The fixed cover 29 is fixed to the turntable 3 and covers the left side to part of an upper area over the engine room 27. The rear hood 28 covers areas over and behind the engine room 27.

In the engine room 27, the engine 11 is disposed to extend transversely with the excavator 4 seen to be at the front (with a crankshaft extending horizontally and perpendicular to a traveling direction of the backhoe). A multiple hydraulic pump 33 is disposed to the right of the engine 11 to be driven by the later. A radiator 34 is disposed to the left of the engine 11.

An arched support frame 35 formed of a pipe material is disposed on the turntable 3 so as to straddle the engine 11, hydraulic pump 33 and radiator 34. This support frame 35 supports an air cleaner 36 and other devices, and an upper portion of rear hood 28. A backing frame (canopy or safety frame) 37 is erected behind the driver's seat 12.

The rear hood 28 is pivotably supported at an upper forward end thereof by the support frame 35 through a pivot device 30 such as hinges having a transverse pivot axis (extending horizontally and perpendicular to the traveling direction of the backhoe). The rear hood 28 includes a lock 32 disposed in a lower rear position thereof for locking to the weight 26.

The radiator 34 has a radiator fan 34a of the induced draft type for drawing air into the engine room 27 through an air inlet (not shown) formed in the left side of rear hood 28 or in a lower portion of turntable 3, to cool the engine 11. Hot air is released outward through the right side of rear hood 28. A fuel tank 40 is disposed inside a left portion of turntable 3 which is at the air suction side.

An hydraulic equipment room 41 is formed at the right side opposite the driver's seat 12 and forwardly of the hydraulic pump 33. This room 41 accommodates an oil tank 38 and a control valve 39. An approximately box-shaped side hood 42 covers the top, front, left and right areas of the room 41. The side hood 42 is open at the rear end thereof. A rear edge 42a of side hood 42 in a closed position is adjacent and opposed to a front edge 28a at the right side of rear hood 28 also in a closed position. When the two hoods 28 and 42 are closed, the side edge 42a and front edge 28a are at the same level so that a smooth transition is provided from one upper surface to the other with no irregularity.

The side hood 42, rear hood 28 and fixed cover 29 may be formed of sheet metal but, in this embodiment, they are formed of plastic. A reinforcing frame 43 is provided on an upper inner surface of side hood 42. As seen from FIGS. 3 and 5, the reinforcing frame 43 includes a front plate 43a bolted to a lower front portion of side hood 42, a rear plate 43b bolted to a upper rear portion of side hood 42, and one or a plurality of rods 43c extending between the two plates 43a and 43b.

Figure 6:
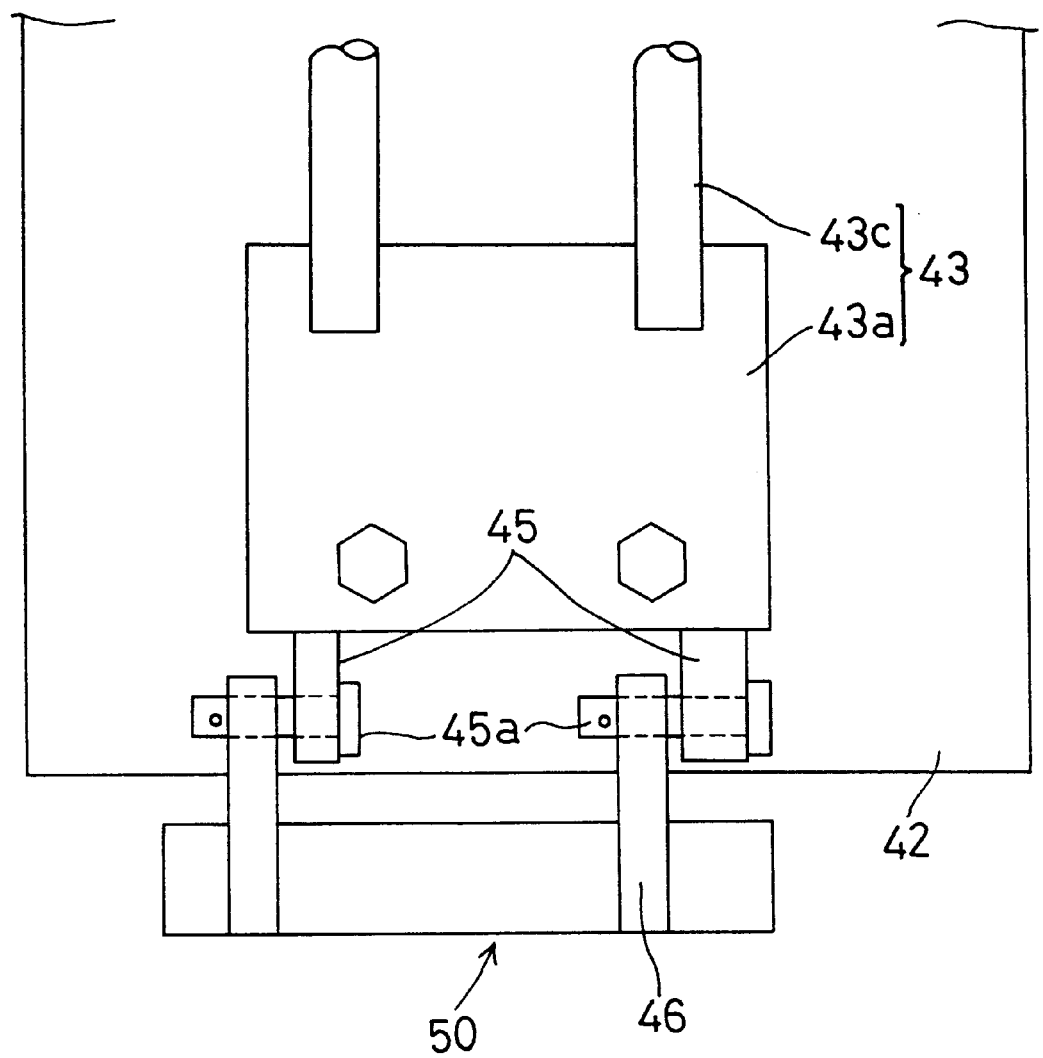
FIG. 6 is a rear view showing a pivot mechanism of the side hood.

As shown in FIG. 6, the front plate 43a has pivotable brackets 45 connected, through pivot pins 45a having a transverse axis, to a pivot brackets 46 fixed to the turntable 3. Consequently, the side hood 42 is supported at the lower front end thereof by the turntable 3 to be pivotable about the transverse axis. By pulling beta pins out of the pivot pins 45a, the pivotable brackets 45 may be disconnected from the pivot brackets 46. As a result, the side hood 42 swung to an open position may be detached from the turntable 3. The pivotable brackets 45, pivot brackets 46 and pivot pins 45a constitute a pivot mechanism 50 of the side hood 42.

Figure 5:
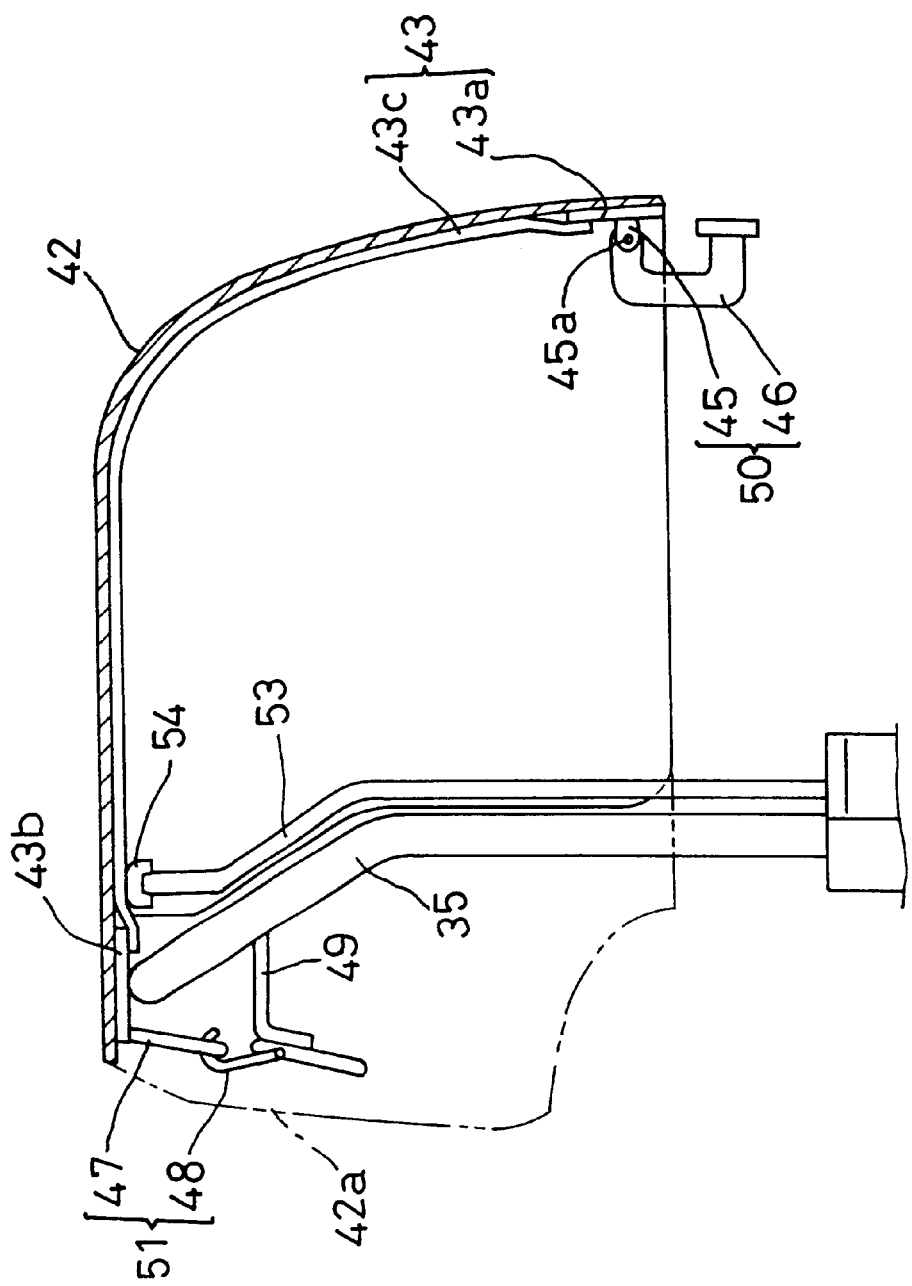
FIG. 5 is a sectional side view of a side hood.

As seen from FIGS. 5 and 7, the rear plate 43b has a catch 47 while the support frame 35 has a hook 48 attached thereto through a bracket 49. The hook 48 is engageable with the U-shaped catch 47 to lock the upper rear end of side hood 42 in the closed position to the turntable 3. The U-shaped catch 47 and hook 48 constitutes a locking device 51 of side hood 42.

The locking device 51 is a so-called hook type clamp, and is disposed adjacent a right edge of rear hood 28. When the rear hood 28 is swung upward to an open position to allow access from a rearward position, the locking device 51 may be locked and unlocked through the engine room 27.

As noted above, the side hood 42 is supported at the lower front end thereof through the pivot mechanism 50, and has the locking device 51 disposed in a rearward position to be accessible by opening the rear hood 28. The side hood 42 cannot be opened without opening the rear hood 28. Thus, only the lock 32 for the rear hood 28 is required.

In FIGS. 2 and 3, numeral 53 denotes a shielding plate U-shaped in front view, which is disposed in the tank room 41 so as to straddle the oil tank 38, and has a seal 54 mounted peripherally thereof for contacting an inner peripheral surface of side hood 42. This shielding plate 53 restricts hot air in the engine room 27 flowing toward the control valve 39. The shielding plate 53 defines recesses for engaging and supporting the rods 43c of reinforcing frame 43. When the side hood 42 is closed, the shielding plate 53 acts as a cushion to contact and elastically support the rods 43c.

In the above embodiment, when inspecting and maintaining the equipment on the turntable 3, the lock 32 is released first, and the rear end of rear hood 28 is lifted to the open position by swinging about the upper front end. The locking device 51 exposed as a result of opening of the rear hood 28 is released to unlock the rear of side hood 42. Then, the rear of side hood 42 lifted to the open position by swinging about the lower front end.

When the rear hood 28 and side hood 42 are swung to the respective open positions, the engine room 27 and tank room 41 are exposed in a continuous, approximately L-shaped form in plan view. In side view, areas above the weight 26 and right side cover 31 are fully opened. Areas above and behind the engine 11, and areas above and laterally of the oil tank 38 and control valve 39, are opened. Almost all locations on the turntable 3 requiring inspection and maintenance are exposed to present a panoramic view to the operator.

As shown in FIG. 3, the side hood 42 is pivotable up to approximately 90 degrees to the open position. In the open position, the side hood 42 rests on a walk-through portion 3a of turntable 3, thereby retaining the open position of side hood 42. The operator is prohibited from walking along the walk-through portion 3a, thereby to avoid the control valve 39 in an open position being inadvertently operated by contact with the operator's foot or the like. The side hood 42 is movable sideways while standing on the turntable 3 when the pivot pins 45a are drawn out of the pivot brackets 46. Thus, the side hood 42 may be detached from the turntable 3 with ease.

This invention is not limited to the above embodiment but may be modified in various ways. For example, the backhoe 1 may be the standard turn type or ultra-small turn type. Instead of the rear frame 36, a cab enclosing the driver's seat 12 may be mounted on the turntable 3. The battery may be disposed adjacent the control valve 39 or other location. The shielding plate 53 may be disposed between the oil tank 38 and hydraulic pump 33. The fuel tank 40 may be disposed in the tank room 41, with the radiator 34 being the forward blow-off type.

What is claim is:

1. A swivel type vehicle comprising:
   a traveling device;
   a turntable mounted on said traveling device to be revolvable about a vertical axis;
   an engine disposed in a rear region of said turntable;
   a hydraulically actuated implement disposed in a front region of said turntable;
   hydraulic equipment disposed on one side region of said turntable;
   a rear hood covering said engine;
   a pivot device disposed in an upper front end region of said rear hood and having a pivot axis extending transversely of a vehicle body, said rear hood being pivotable by said pivot device between a closed position covering said engine and an open position exposing said engine;
   a side hood covering said hydraulic equipment; and
   a pivot mechanism disposed in a lower front end region of said side hood and having a pivot axis extending transversely of the vehicle body, said side hood being pivotable by said pivot mechanism between a closed position covering said hydraulic equipment and an open position exposing said hydraulic equipment,
   wherein said side hood includes a locking mechanism disposed in a rear region thereof for locking said side hood to said closed position, said locking mechanism being accessible from outside when said rear hood is opened, and inaccessible from outside when said rear hood is closed.

2. A swivel type working vehicle as defined in claim 1, wherein said rear hood in said closed position and said side hood in said closed position have opposed edges substantially level with each other to form a smooth transition from an upper surface of said rear hood to an upper surface of said side hood.

3. A swivel type working vehicle as defined in claim 1, wherein said side hood defines a boundary on one side of said turntable, and said rear hood defines a rearward boundary of said turntable, a driver's seat being disposed in a space partially surrounded by said rear hood and said side hood.

4. A swivel type working vehicle as defined in claim 1, wherein said side hood is removable from said pivot mechanism.

5. A swivel type working vehicle as defined in claim 1, wherein said side hood is formed of plastic, and has a reinforcing frame extending in a fore and aft direction along an inner surface thereof, said pivot mechanisms mechanism being connected to said reinforcing frame.

6. A swivel type working vehicle as defined in claim 1, further comprising an arched support frame is fixed to said turntable so as to straddle said engine, said pivot device being attached to said support frame.

7. A swivel type working vehicle comprising:
   a traveling device;
   a turntable mounted on said traveling device to be revolvable about a vertical axis;
   an engine disposed in a rear region of said turntable;
   a hydraulically actuated implement disposed in a front region of said turntable;
   hydraulic equipment disposed on one side region of said turntable;
   a rear hood covering said engine;
   a pivot device disposed in an upper front end region of said rear hood and having a pivot axis extending transversely of a vehicle body, said rear hood being pivotable by said pivot device between a closed position covering said engine and an open position exposing said engine;
   a side hood covering said hydraulic equipment;
   a pivot mechanism disposed in a lower front end region of said side hood and having a pivot axis extending transversely of the vehicle body, said side hood being pivotable by said pivot mechanism between a closed position covering said hydraulic equipment and an open position exposing said hydraulic equipment; and
   an arched support frame fixed to said turntable so as to straddle said engine, said pivot device being attached to said support frame.

8. A swivel type working vehicle as defined in claim 7, wherein said rear hood in said closed position and said side hood in said closed position have opposed edges substantially level with each other to form a smooth transition from an upper surface of said rear hood to an upper surface of said side hood.

9. A swivel type working vehicle as defined in claim 7, wherein said side hood defines a boundary on one side of said turntable, and said rear hood defines a rearward boundary of said turntable, a driver's seat being disposed in a space partially surrounded by said rear hood and said side hood.

10. A swivel type working vehicle as defined in claim 7, wherein said side hood is removable from said pivot mechanism.

11. A swivel type working vehicle as defined in claim 7, wherein said side hood is formed of plastic, and has a reinforcing frame extending in a fore and aft direction along an inner surface thereof, said pivot mechanisms mechanism being connected to said reinforcing frame.

12. A swivel type working vehicle comprising:

a traveling device;

a turntable mounted on said traveling device to be revolvable about a vertical axis, said turntable including a floor;

an engine disposed in a rear region of said turntable;

a hydraulically actuated implement disposed in a front region of said turntable;

hydraulic equipment disposed on one side region of said turntable;

a rear hood covering said engine;

a pivot device disposed in an upper front end region of said rear hood and having a pivot axis extending transversely of a vehicle body, said rear hood being pivotable by said pivot device between a closed position covering said engine and an open position exposing said engine;

a side hood covering said hydraulic equipment; and a pivot mechanism disposed on said turntable floor in a lower front end region of said side hood and having a pivot axis extending transversely of the vehicle body, said side hood being pivotable by said pivot mechanism between a closed position and an open position, and having an upper surface, wherein when said side hood is in its closed position, said upper surface extends from said upper front end region of said rear hood through to said turntable floor, for covering said hydraulic equipment, whereas when said side hood is in its open position, said side hood is pivoted upward about said pivot axis of said pivot mechanism, for exposing said hydraulic equipment, and said side hood includes a locking mechanism disposed in a rear region thereof for locking said side hood to said closed position, said lock means being accessible from outside when said rear hood is opened, and inaccessible from outside when said rear hood is closed.

13. A swivel type working vehicle as defined in claim 12, wherein said rear hood in said closed position and said side hood in said closed position have opposed edges substantially level with each other to form a smooth transition from an upper surface of said rear hood to an upper surface of said side hood.

14. A swivel type working vehicle as defined in claim 12, wherein said side hood defines a boundary on one side of said turntable, and said rear hood defines a rearward boundary of said turntable, a driver's seat being disposed in a space partially surrounded by said rear hood and said side hood.

15. A swivel type working vehicle as defined in claim 12, wherein said side hood is removable from said pivot mechanism.

16. A swivel type working vehicle as defined in claim 12, wherein said side hood is formed of plastic, and has a reinforcing frame extending in a fore and aft direction along an inner surface thereof, said pivot mechanism being connected to said reinforcing frame.

17. A swivel type working vehicle comprising:

a traveling device;

a turntable mounted on said traveling device to be revolvable about a vertical axis, said turntable including a floor;

an engine disposed in a rear region of said turntable;

a hydraulically actuated implement disposed in a front region of said turntable;

hydraulic equipment disposed on one side region of said turntable;

a rear hood covering said engine;

a pivot device disposed in an upper front end region of said rear hood and having a pivot axis extending transversely of a vehicle body, said rear hood being pivotable by said pivot device between a closed position covering said engine and an open position exposing said engine;

a side hood covering said hydraulic equipment;

a pivot mechanism disposed on said turntable floor in a lower front end region of said side hood and having a pivot axis extending transversely of the vehicle body, said side hood being pivotable by said pivot mechanism between a closed position and an open position, and having an upper surface; and an arched support frame is fixed to said turntable so as to straddle said engine, said pivot device being attached to said support frame, wherein when said side hood is in its closed position, said upper surface extends from said upper front end region of said rear hood through to said turntable floor, for covering said hydraulic equipment, whereas when said side hood is in its open position, said side hood is pivoted upward about said pivot axis of said pivot mechanism, for exposing said hydraulic equipment.

18. A swivel type working vehicle as defined in claim 17, wherein said rear hood in said closed position and said side hood in said closed position have opposed edges substantially level with each other to form a smooth transition from an upper surface of said rear hood to an upper surface of said side hood.

19. A swivel type working vehicle as defined in claim 17, wherein said side hood defines a boundary on one side of said turntable, and said rear hood defines a rearward boundary of said turntable, a driver's seat being disposed in a space partially surrounded by said rear hood and said side hood.

20. A swivel type working vehicle as defined in claim 17, wherein said side hood is removable from said pivot mechanism.

21. A swivel type working vehicle as defined in claim 17, wherein said side hood is formed of plastic, and has a reinforcing frame extending in a fore and aft direction along an inner surface thereof, said pivot mechanism being connected to said reinforcing frame.

\* \* \* \* \*

UNITED STATES PATENT AND TRADEMARK OFFICE
CERTIFICATE OF CORRECTION

PATENT NO. : 6,615,942 B2
DATED : September 9, 2003
INVENTOR(S) : Eisaku Shinohara et al.

It is certified that error appears in the above-identified patent and that said Letters Patent is hereby corrected as shown below:

Column 2,
Line 31, "film" should read -- from --.

Column 4,
Lines 7, 9 and 10, "dosed" should read -- closed --.

Column 6,
Lines 16 and 66, "mechanisms mechanism" should read -- mechanism --.

Signed and Sealed this

Twentieth Day of January, 2004

JON W. DUDAS
*Acting Director of the United States Patent and Trademark Office*